Aug. 8, 1933.  A. H. DU GRENIER  1,921,611
CHECK TESTING MECHANISM
Filed Oct. 20, 1931

Inventor.
Arthur H. Du Grenier
by S. H. Hamilton,
Atty.

Patented Aug. 8, 1933

1,921,611

UNITED STATES PATENT OFFICE 1,921,611

CHECK TESTING MECHANISM

Arthur H. Du Grenier, Haverhill, Mass.; Francis C. Du Grenier, administrator of said Arthur H. Du Grenier, deceased, assignor of one-half to Francis C. Du Grenier and one-half to Blanche E. Bouchard, Haverhill, Mass.

Application October 20, 1931. Serial No. 569,895

6 Claims. (Cl. 194—103)

This invention relates to check-controlled mechanism, which is used in connection with vending machines, and in which the weight of a circular check is tested before it is permitted to pass on to a point at which it will release the dispensing mechanism of the machine and permit delivery of the goods.

More particularly the invention relates to certain improvements on the type of weight testing mechanism shown in Patent No. 1,231,243, issued on June 26, 1917, jointly to myself and another, in which the check is delivered to a weight tester of the tiltable type, so arranged that, if the weight of the check which is inserted is up to standard, the tester will tilt on its pivot and deliver the check to the releasing mechanism.

With a mechanism of this type, if the check is under the standard weight it will be retained by the weight tester, so that such a mechanism must not only test the check accurately as to weight, but means must also be provided for freeing the tester of under weight checks and restoring them to the vendor before another check is inserted. Also, to test the weight of check accurately by a tiltable device of the character of said prior patent the check should be held stationary momentarily at a certain point on the tester, so that the action of the tester will be uniform.

The objects of my invention are to provide a simple and effective means for accurately testing the weight of a check, in a check-controlled mechanism, so that, when a check of standard weight is placed in the machine, it will pass on to the check released mechanism without delay, while one of less than standard weight will be retained by the tester and then freed therefrom and restored to the vender when it is attempted to operate the dispensing mechanism.

I accomplish these objects by providing a check tester of the tilting type which is so mounted that, when tilted in one direction, its check supporting face will direct the check into a check receiving passage, and, when tilted in the opposite direction, will direct it into a check restoring passage. Also, by normally holding the tester in such a position that its check supporting face will be inclined to a position to return the check and by providing in conjunction therewith, a check intercepting device which normally prevents return of the check but momentarily holds the check stationary in a predetermined position on the tester, so that the weighing action will be accurately performed, said intercepting device being moved from its operative position by a preliminary movement of the dispensing operating means, so that if the check has been retained by the weight tester, it will be permitted to pass into the check restoring passage.

For a more complete disclosure of the invention, reference is made to the following specification in connection with the accompanying drawing, in which:—

Figure 3:
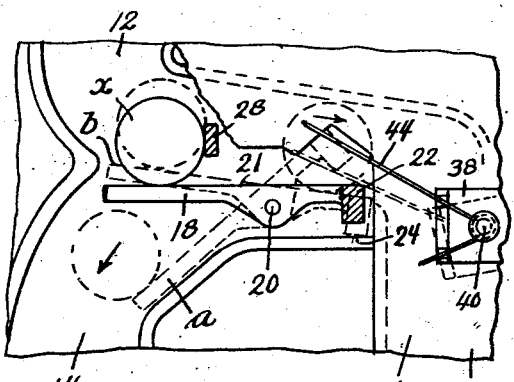
Fig. 3 is a detail view of the weight tester.

In the drawing, only those parts which are directly associated with the particular invention claimed are illustrated.

According to my invention an upright wall or partition 10 within the machine casing is provided with a check entrance passage 12, which extends downward from the point at which the check is inserted, a check receiving passage 14, which is branched therefrom in one direction and a check rejecting or restoring passage 16, which is branched therefrom in the opposite direction, the arrangement being such that, if the check is delivered to the passage 14, it will then act to permit operation of the dispensing mechanism in connection with which it is used, and then will be delivered to a check-receiving receptacle, or, if it is delivered to the passage 16, it will be conducted to a position which permits it to be recovered.

I further provide a weight tester, which comprises a rigid bar 18, which is mounted in partition 10 on a horizontal pivot 20, and has a top face 21, which is normally disposed nearly horizontally in position to receive the checks from the entrance passage 12 and support them on edge, said bar 18 being also mounted between the receiving passage 14, and the restoring passage 16 in such a position that, when tilted from the horizontal in one direction it will tilt towards the receiving passage and when tilted in the opposite direction it will tilt towards the restoring passage, so that a check supported on edge by said face 21 will be delivered therefrom into the passage towards which it is tilted.

Figure 1:
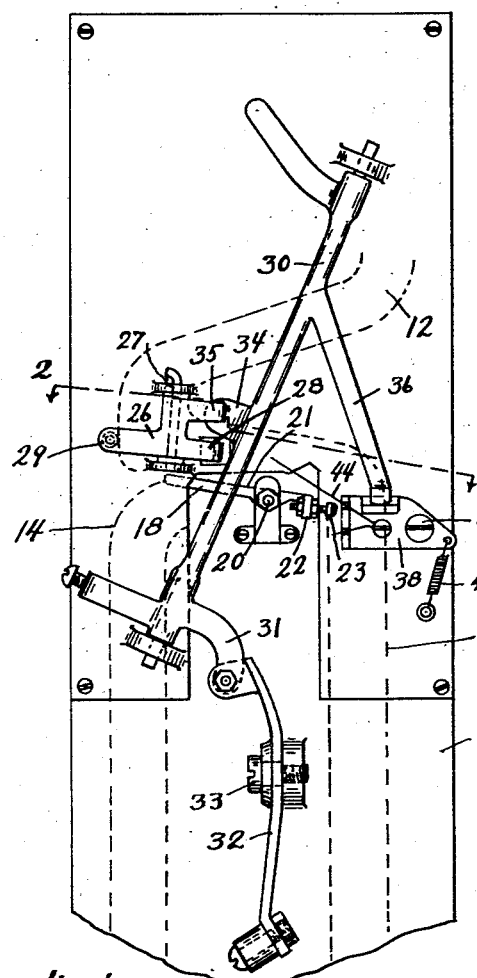
Fig. 1 is a side elevation of a preferred embodiment of the invention.

An arm 22 is extended from the bar 18 at the side of the pivot next the restoring passage 16 and is provided with an adjustable counter weight 23. A portion 24 of the partition is arranged to be engaged by arm 22 and to act as a stop to limit the tilting movement of the bar at a point at which its top face 21 is inclined towards the passage 16, as shown in Fig. 1, and in the dotted line postion b of Fig. 3, and the counter weight 23 is adjusted normally to hold the bar in this position.

Figure 2:
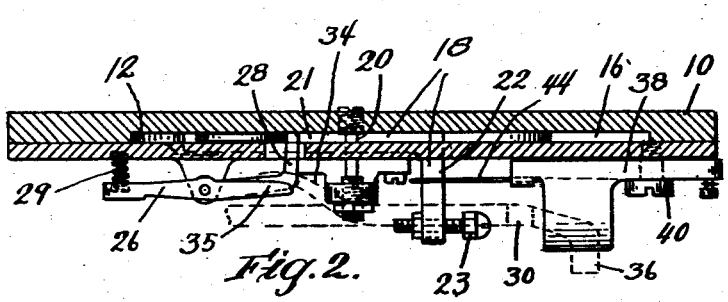
Fig. 2 is a sectional view at line 2—2 of Fig. 1.

A check intercepting device is provided in connection with said weight tester, which comprises a lever 26 mounted to swing nearly horizontally about a pivot 27 and having a finger 28 extending at right angles from one end thereof, said lever 26 being normally held by a spring 29 in a position in which the finger 28 extends across the bar 18 at a short distance above the top face 21 thereof and between the pivot 20 and the end of the bar 18 opposite the counterweight 23, so that when a check, as x, is delivered from the entrance passage 12 to the face 21, it will be intercepted by the finger 28 and held on said face in the positions shown in Figs. 2 and 3.

The check thus comes to a full stop while supported on the face 21 in a predetermined position, and the counterweight 23 is so adjusted that if the weight of the check is up to standard, it will overbalance the counterweight and cause the bar 18 to tilt towards the retaining passage 14, so as to deliver the check thereto, as indicated by the dotted line position a of Fig. 3. If the check is underweight, it will be held on the face 21, by finger 28.

As the person who inserts the check always attempts to operate the dispensing mechanism, to secure delivery of the articles to be vended, after the check has been inserted, means are provided whereby, on an initial movement of the dispensing mechanism, the finger 28 will be withdrawn from its intercepting position, so that the check which has been intercepted by the weight tester will be permitted to pass into the restoring passage 16.

It will be understood in this connection that, in check-released dispensing machines, it is customary to permit an initial operative movement of the dispensing mechanism which is sufficient to free the machine of any checks which may have been intercepted by the various check testing devices with which the machine may be provided, the mechanism being locked against a further operative movement, which would be sufficient to deliver the articles to be vended, unless the locking mechanism has been released by a check or checks of standard characteristics.

Various means may be provided whereby the lever 26 may be swung to an inoperative position on an initial operative movement of the dispensing mechanism, and, as such means will be varied with different machines, it will be understood that the particular means shown have merely been found to be advantageous in connection with a particular machine.

Said means comprises a rod 30, which is mounted at its ends on the partition 10 and is arranged for limited oscillatory movement, said rod having an arm 31 which is arranged to be engaged by a lever 32, pivoted on the partition 10 by pin 33.

As the lever 32 is in practice operatively engaged by the manually controlled operating means of the dispensing mechanism in connection with which the above described weight testing means is employed, it may, for the purpose of this specification, be considered as a manually controlled operating means, which is swung on its pivot to a limited extent and acts to cause a partial rotation of rod 30 when swung from its initial position. Said rod 30 is also provided with a lug 34 which is arranged in engagement with a finger 35 formed integrally with the lever 26, so that, when the lever 32 is moved initially from its normal position, the lever 26 will be swung so as to withdraw the finger 28 from its intercepted position over the top of bar 18, thereby permitting an underweight check which is resting against said finger to roll down the face 21 and be delivered to passage 16.

In case the check is only slightly underweight, it may tilt the bar 18 towards the passage 14, so that the face 21 is almost exactly horizontal, as shown in full lines in Fig. 3. In such case the frictional engagement of the check with the side wall of the passage in which it is supported is likely to be sufficient to prevent the check from rolling into either passage 14 or 16, after the finger 28 has been moved to its inoperative position. To insure the discharge of the check into the restoring passage under these conditions, the rod 30 is also provided with an arm 36 which is arranged to engage a lever 38, mounted on a pivot 40 and normally held in the position of Fig. 1 by a spring 42, said lever 38 having a resilient wire 44 thereon, which is arranged to engage the arm 22 of bar 18 when the lever 38 is swung to carry the wire 44 downward.

As thus arranged, when the lever 32 is moved initially from its normal position, and moves finger 28 out of its check intercepting position, the arm 36 at the same time acts to depress the arm of lever 38 which carries the wire 44, so that the latter is pressed against the arm 22 of bar 18 with sufficient force to overbalance any check which may be held thereon in the full line position of Fig. 3, so that the bar 18 will be returned to its normal position (dotted line position b in Fig. 3), in which its top face 21 is inclined towards the passage 16 to an extent sufficient to cause any check which may be supported thereon to roll down said face and be delivered to the passage 16.

The delivery of any check, which has been intercepted by the weight tester, to the check restoring passage, is thus assured under all conditions, immediately upon any attempt being made to operate the dispensing mechanism.

Inasmuch as the check under all conditions is momentarily held practically stationary on the face 21 of the weight-testing bar, the weight of the check will be accurately tested under all conditions and will be received or rejected and restored according to whether its weight is up to standard or less than standard.

I claim:

1. In a check-controlled mechanism, a support having a check-entrance passage and a check-receiving, and a check-restoring passage branching therefrom, a weight tester pivotally mounted at the junction of said passages and having a face on its top side arranged to receive a check from said entrance passage and support it at the side of the pivot next said receiving passage, to permit a check of standard weight to tilt the tester and be delivered to said receiving passage, said tester being normally held with said face inclined towards said restoring passage in position to deliver a check thereto, an intercepting device normally operative to prevent delivery of a check from said face to said restoring passage, and manually controlled means arranged when operated to move said intercepting device to an inoperative position and permit delivery of a check of less than standard weight to said restoring passage.

2. In a check-controlled mechanism, a support having a check-entrance passage and a check-receiving, and a check-restoring passage branching therefrom, a weight tester pivotally mounted at the juncture of said passages and having a check-supporting face on its top side arranged to receive a check from said entrance passage intercepting means whereby the check will be supported on said face at the side of the pivot next said receiving passage, and a check of standard weight may tilt the tester towards said receiving passage and be delivered thereto and manually controlled operating means arranged when operated to tilt said tester towards said restoring passage and deliver a check of less than standard weight thereto.

3. In a check-controlled mechanism, a support having a check-entrance passage, a check-receiving passage and a check-restoring passage, branching from said entrance passage in opposite directions, a weight tester pivotally mounted between said receiving and restoring passages in position to receive a check delivered from said receiving passage and tiltable in one direction by a check of standard weight to deliver the check to said receiving passage, and in the opposite direction to deliver a check of less than standard weight to said restoring passage, yieldable means for normally holding said tester in a position in which it will deliver a check of less than standard weight to said restoring passage, and controlling means normally operative to prevent delivery of the check from said tester to said restoring passage and manually movable to permit delivery thereto.

4. In a check-controlled mechanism, a support having a check-entrance passage, a check-receiving passage and a check-restoring passage branching from said entrance passage in opposite directions, a weight tester pivotally mounted between said receiving and restoring passages in position to receive a check delivered from said receiving passage and tiltable in one direction by a check of standard weight to deliver the check to said receiving passage, and in the opposite direction to deliver a check of less than standard weight to said restoring passage, a stop arranged to limit the tilting movement of said tester towards said restoring passage, a counterweight on said tester for normally holding the same engaged with said stop, an intercepting device normally acting to prevent delivery of a check from said tester to said restoring passage, and manually controlled means arranged when operated to move said intercepting device to an inoperative position and to reinforce the action of said counterweight.

5. In a check controlled mechanism, a support having a downwardly extending check-entrance passage and a check-receiving passage and a check-restoring passage branching therefrom in opposite directions, a bar having a check supporting top face and pivotally mounted between said receiving and restoring passage to tilt in one direction to deliver a check thereon to said receiving passage and in the opposite direction to deliver it to said restoring passage, said bar having yieldable means for normally holding it with its top face nearly horizontal and the portion of said bar at the side of the pivot next said receiving passage being arranged to receive the check from said entrance passage, an intercepting device normally disposed above said bar between its pivot and its end next said receiving passage, to hold the check in a predetermined position on said face when it is delivered thereto from the entrance passage, whereby a check of standard weight may tilt the bar and be discharged into said receiving passage and one of less than standard weight may be retained on said face, and means for moving said intercepting device out of intercepting position and for holding said bar with its top face inclined towards said restoring passage to discharge the retained check into the same.

6. In a check controlled mechanism, a support having a check-entrance passage and a check-receiving, and a check-restoring passage branching therefrom, a weight tester comprising a rigid bar pivotally mounted at the juncture of said passages and having a top face extending lengthwise of the bar at each side of and in transverse relation to its pivot and in position to receive a check from said entrance passage, said bar being tiltable in one direction by a check of standard weight to deliver the check to said receiving passage, means including a counter weight for normally holding said bar tilted in the opposite direction and in position to deliver a check of less than standard weight to said restoring passage, an intercepting device normally disposed in position to hold a check on said face at the side of the pivot next said receiving passage when delivered thereto from said entrance passage, and manually controlled operating means arranged when operated to move said intercepting device to an inoperative position and permit delivery of a check of less than standard weight to said restoring passage.

ARTHUR H. Du GRENIER.